US011351581B2

(12) United States Patent
Schmauder et al.

(10) Patent No.: US 11,351,581 B2
(45) Date of Patent: Jun. 7, 2022

(54) DROP HEAD ATTACHMENT FOR TOILET AUGER

(71) Applicant: Ridge Tool Company, Elyria, OH (US)

(72) Inventors: Christopher Schmauder, North Olmstead, OH (US); Richard R. Bowles, Solon, OH (US); Sachin Shashikant Dakare, Maharashtra (IN); Sandeep Sidagouda Patil Patil, Maharashtra (IN)

(73) Assignee: Ridge Tool Company, Elyria, OH (US)

( * ) Notice: Subject to any disclaimer, the term of this patent is extended or adjusted under 35 U.S.C. 154(b) by 855 days.

(21) Appl. No.: 16/209,226

(22) Filed: Dec. 4, 2018

(65) Prior Publication Data

US 2020/0078836 A1    Mar. 12, 2020

(51) Int. Cl.
| | |
|---|---|
| *B08B 9/045* | (2006.01) |
| *E03C 1/302* | (2006.01) |
| *E03F 9/00* | (2006.01) |
| *F16D 3/22* | (2006.01) |
| *F16D 3/38* | (2006.01) |

(52) U.S. Cl.
CPC .............. *B08B 9/045* (2013.01); *E03C 1/302* (2013.01); *E03F 9/005* (2013.01); *F16D 3/22* (2013.01); *F16D 3/38* (2013.01)

(58) Field of Classification Search
CPC .......... B08B 9/045; E03C 1/302; E03F 9/005; F16D 3/22; F16D 3/38
See application file for complete search history.

(56) References Cited

U.S. PATENT DOCUMENTS

| | | | | |
|---|---|---|---|---|
| 2,779,041 A | * | 1/1957 | Silverman | E03C 1/302 464/174 |
| 3,159,861 A | * | 12/1964 | Sarcone | E03F 9/005 254/134.3 R |
| 3,397,420 A | | 8/1968 | Schneider | |
| 4,692,957 A | * | 9/1987 | Kovacs | B08B 9/045 254/134.3 FT |
| 2015/0104241 A1 | * | 4/2015 | Spelich | E03F 9/00 403/62 |
| 2018/0104727 A1 | * | 4/2018 | Lokkinen | B08B 9/045 |
| 2018/0126430 A1 | * | 5/2018 | Lokkinen | B60C 27/0223 |
| 2018/0355599 A1 | * | 12/2018 | Kippo | B23K 26/38 |

FOREIGN PATENT DOCUMENTS

| | | |
|---|---|---|
| CN | 2594517 Y | 12/2003 |
| CN | 105508463 A | 4/2016 |

OTHER PUBLICATIONS

CN Office Action dated Aug. 21, 2020; Application No. 201910662157.3; 21 pages.

* cited by examiner

*Primary Examiner* — Weilun Lo
(74) *Attorney, Agent, or Firm* — Mark E. Bandy; Rankin, Hill & Clark LLP

(57) ABSTRACT

Various drop head coupling assemblies are described. The coupling assemblies enable a drop head tool typically used in drain cleaning operations to be releasably engaged with a drain cleaning cable. The coupling assemblies enable the drop head tool to undergo a wide range of motion relative to the drain cleaning cable, particularly during rotation of the cable and drop head.

13 Claims, 4 Drawing Sheets

DROP HEAD ATTACHMENT FOR TOILET AUGER

FIELD

The present subject matter relates to augers and plumbing tools for clearing stoppages or clogs in waste pipes and particularly those leading from sinks, urinals, and toilets.

BACKGROUND

A wide array of drain cleaning tools are known for clearing obstructions from drain lines. One type of tool is directed to the clearing of obstructions from toilets and urinals, commonly known as augers. Augers comprise several components common to nearly all models: a drain cleaning cable, provisions to rotate the cable, a cleaning tool incorporated or separate from the cable, and an outer tubular housing. Operations involve rotating the cable to grab, drill, or push a blockage through the piping system. Augers are used to quickly and safely clear blockages in toilets, urinals, and small drains.

A variety of tools and attachments are known which are engaged with a distal end of the drain cleaning cable. Examples of such detachable tools include, but are not limited to, cutter heads and drop heads. Existing drop head designs are fixed at their connection point at the cable end. And so, these known drop heads have difficulty navigating within the tight passages associated with most toilets and urinals. Accordingly, a need exists for an assembly that enables a drop head cleaning tool to be removably attached to an auger and which provides increased flexibility and maneuverability for the tool within tight passages such as those typically associated with toilets and urinals.

SUMMARY

The difficulties and drawbacks associated with previous assemblies and approaches are addressed in the present subject matter as follows.

In one aspect, the present subject matter provides a drop head coupling assembly comprising a cable coupling defining a proximal face, an opposite distal face, a recessed receiving region accessible along the distal face, and an aperture extending between an outer region of the coupling and the recessed receiving region. The drop head coupling assembly also comprises a pin sized and shaped to be positioned in the aperture defined in the cable coupling. And, the drop head coupling assembly comprises a connector having a proximal receiving region defining a first aperture extending through the proximal receiving region, and a distal receiving region defining a second aperture extending through the distal receiving region. The proximal receiving region of the connector is sized and shaped to be positioned within the recessed receiving region of the cable coupling such that the pin can be inserted through the aperture of the cable coupling and through the first aperture of the connector to thereby engage the cable coupling with the connector.

In another aspect, the present subject matter provides a drop head coupling assembly for use with a drain cleaning cable. The coupling assembly comprises a first fork including a base having provisions for releasably engaging a drain cleaning cable, and at least two engagement prongs spaced apart from one another. Each engagement prong defines an engagement aperture. The drop head coupling assembly also comprises a second fork including a base defining an aperture, and at least two engagement prongs spaced apart from one another. Each engagement prong defines an engagement aperture. The drop head coupling assembly also comprises a center block sized and shaped to be positioned between the engagement prongs of the first fork and the engagement prongs of the second fork. The center block includes engagement members sized and shaped for positioning in the engagement apertures of the prongs of the first fork and the engagement apertures of the prongs of the second fork. The drop head coupling assembly further comprises a pin sized and shaped to be positioned in the aperture of the base of the second fork.

In yet another aspect, the present subject matter provides a drop head coupling assembly comprising a cable coupling defining a proximal face, an opposite distal face, a recessed receiving region accessible along the distal face, and an aperture extending between an outer region of the coupling and the recessed receiving region. The drop head coupling assembly also comprises a pin sized and shaped to be positioned in the aperture defined in the cable coupling. The drop head coupling assembly also comprises a connector having a proximal receiving region defining a first slot extending through the proximal receiving region, and a distal receiving region defining a second slot extending through the distal receiving region. The proximal receiving region of the connector is sized and shaped to be positioned within the recessed receiving region of the cable coupling such that the pin can be inserted through the aperture of the cable coupling and through the first slot of the connector to thereby engage the cable coupling with the connector. The drop head coupling assembly also comprises a bushing defining a proximal face, an oppositely directed distal face, and a hollow interior extending between the proximal and distal faces. The proximal receiving region of the connector is sized and shaped to be inserted into and through the hollow interior of the bushing.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides various drop head coupling assemblies. In certain embodiments, the coupling assembly comprises a cable coupling, a connector, and one or more pins. A drain cleaning cable with a conventional coupler engages the cable coupling, such as for example via a quick connection as known in the art. The cable coupling engages with the connector by use of a pin. And the connector is engaged to a drop head and its associated coupling with another pin. Because of pivoting actions between the cable coupling, the connector, and the drop head coupling, the drop head tool achieves a relatively high degree of freedom of movement and hence can more easily navigate through various passages and drains, and clear such passages of blockage or clogging. These and other aspects of the drop head coupling assemblies are described herein.

Figure 1:
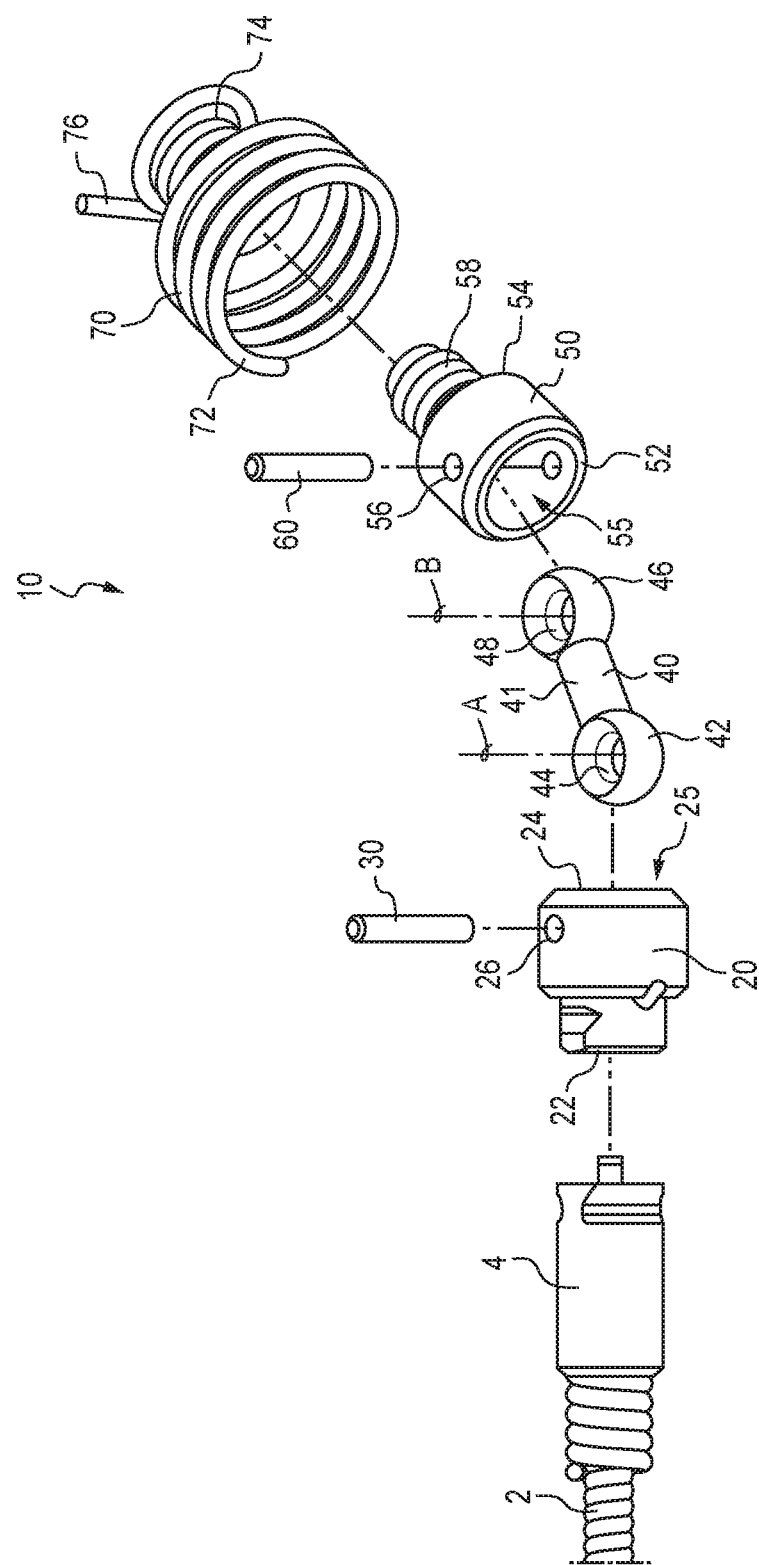
FIG. 1 is an exploded assembly view of an embodiment of a drop head coupling assembly in accordance with the present subject matter, shown with an end of a drain cleaning cable and a drop head.
Figure 2:
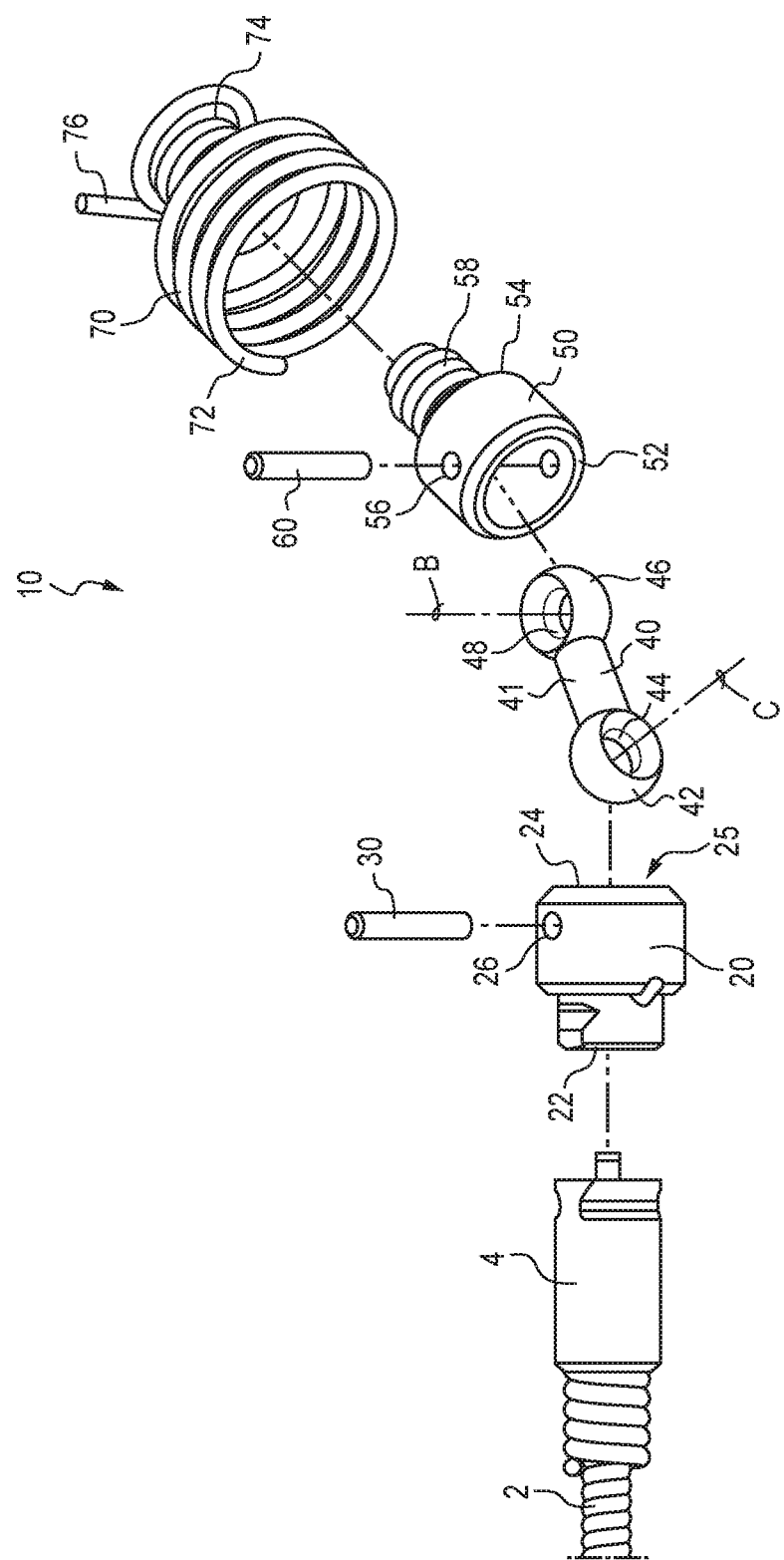
FIG. 2 is an exploded assembly view of a variant of the embodiment of FIG. 1.

FIGS. 1 and 2 are exploded assembly views of an embodiment of a drop head coupling assembly 10 in accordance with the present subject matter. The coupling assembly 10 engages with a coupling 4 of a drain cleaning cable 2. The coupling assembly 10 comprises a cable coupling 20, a connector 40, and one or more pins such as pins 30 and 60. The coupling assembly 10 engages the cable 2 and its coupling 4 with a drop head coupling 50 and its associated drop head tool 70.

The cable coupling 20 defines a proximal face 22, a distal face 24 which is typically oppositely directed from the proximal face 22, and a recessed receiving region 25 accessible from the distal face 24. The cable coupling 20 also defines at least one aperture 26 extending from an outer or exterior region of the coupling 20 to the receiving region 25. In many versions, the aperture(s) 26 are radially oriented with respect to a center longitudinal axis of the cable coupling 20. The aperture(s) 26 are sized and shaped to receive the pin 30 positioned therein. The cable coupling 20 can include provisions for selectively engaging the cable coupling 20 with the coupling 4 of the drain cleaning cable 2. In certain versions, these provisions are referred to as "quick connect" or as a "quick connection" as known in the art. Representative non-limiting examples of couplings such as coupling 4 and provisions for selective engagement are described in U.S. Pat. Nos. 4,403,885 and 3,397,420 for example.

The connector 40 defines (i) a proximal portion or receiving region 42 and (ii) a distal portion or receiving region 46. The proximal receiving region 42 defines a first aperture 44 extending through the proximal portion 42. And the distal receiving region 46 defines a second aperture 48 extending through the distal portion 46.

The proximal portion 42 of the connector 40 and/or the receiving region 25 of the cable coupling 20 are sized and shaped such that the proximal portion 42 can be positioned within the receiving region 25 and the pin 30 inserted into the aperture 26 of the cable coupling 20 and through the first aperture 44 of the connector 40. This configuration engages the connector 40 to the cable coupling 20.

The distal portion 46 of the connector 40 is sized and shaped such that the distal portion 46 can be positioned within a hollow interior 55 of a drop head coupling 50 and the pin 60 inserted into an aperture 56 of the coupling 50 and through the second aperture 48 of the connector 40. This configuration engages the connector 40 to the drop head coupling 50.

Many drop head couplings such as the drop head coupling 50 referenced in the noted figures, define a proximal face 52, an opposite distal face 54, and a generally hollow interior 55 extending between the faces 52, 54 or substantially so. The hollow interior 55 is accessible along the proximal face 52. The coupling 50 also defines an aperture 56 for receiving the previously noted pin 60. The aperture 56 typically extends between an outer region of the coupling 50 and the hollow interior 55. The coupling 50 may also include an engagement region 58 for contacting and/or engaging helical coils of a drop head 70. The engagement region 58 may extend axially from the distal face 54.

A typical drop head 70 is shown. The drop head 70 defines a proximal end 72, a distal end 74, and an optional outwardly extending engagement prong 76. In many versions, the drop head is formed from a continuous helically wound wire or metal form. Typically, the diameter or span of the drop head 70 adjacent the proximal end 72 is greater than the diameter or span adjacent the distal end 74. However, the present subject matter includes coupling assemblies that are used with drop heads and/or drop head couplings different than the drop head 70 and the drop head coupling 50 depicted in the referenced figures. The engagement prong 76 serves to contact and disrupt blockages or obstructions that may be encountered in a drain line or other passage. The engagement prong 76 may in certain applications also serve as a point of affixment for other tools and/or accessories to be engaged with the drain cleaning cable.

The connector 40 may be provided in several versions. In the form shown in FIG. 1, the first aperture 44 extends along an aperture axis A which is parallel to an aperture axis B of the second aperture 48. In another version shown in FIG. 2, the apertures 44 and 48 are oriented transverse to each other. Thus, the first aperture 44 extends along an aperture axis C that is transverse to the aperture axis B of the second aperture 48. The present subject matter also includes connectors 40 in which the first and second apertures 44, 48 are oriented in a non-parallel arrangement, yet not at right angles to each other.

Referring further to FIGS. 1 and 2, in another version, the drop head coupling assembly 10 comprises a cable coupling 20 releasably engageable with the coupling 4 by way of a biased spring pin for which the cable coupling 20 has a receiving region allowing the engagement of the spring pin. A variant version of the connector 40 is utilized in which at least one of and particularly each receiving region, i.e., the proximal receiving region 42 and the distal receiving region 46, is in the form of a spherical lobe. And, each spherical lobe defines a conical recessed region instead of the previously noted apertures 44 and 48. Each conical recessed region is sized and shaped so as to further allow multi-axis movement. The connector 40 is further engaged with a drop head coupling 50 through the conical recessed region. A drop head 70 is connected further to the drop head coupling 50 opposite the engagement of the connector 40 with the drop head coupling 50.

In yet another version and with further reference to FIGS. 1 and 2, the drop head coupling assembly 10 comprises a cable coupling 20 releasably engaged with a coupling 4 by way of a biased spring pin for which the cable coupling 20 has a receiving region allowing the engagement of the spring pin. A variant version of the connector 40 is used in which the portion extending between the proximal and distal receiving regions 42, 46; identified in FIGS. 1 and 2 as intermediate member 41, is formed to exhibit flexibility during typical use conditions. Nonlimiting examples of such flexibility include temporary or non-permanent bending of the connector 40 along its longitudinal axis by more than 10° during use of the coupling assembly in an auger as compared to the connector 40 during non-use. Such flexibility may result from selection of certain materials and/or by use of particular geometries for the member 41. A drop head coupling 50 as previously described is engaged with the connector 40. The distal end of the drop head coupling 50 includes a threaded engagement region 58 or like provisions for attachment of a drop head 70.

In the embodiment depicted in FIGS. 1 and 2, the apertures 44 and 48 of the connector 40 are depicted as each having an enlarged entrance. In certain versions of the coupling assemblies 10, these apertures 44, 48 could be provided without the depicted enlarged entrance regions. And so, the apertures 44, 48 could be provided as generally continuous and free of widened entrance and/or exit portions. This variant configuration could reduce manufacturing costs. It will be appreciated that use of particular shapes, sizes, and geometries for the apertures can also be utilized to selectively adjust the flexibility of the connector 40.

Figure 3:
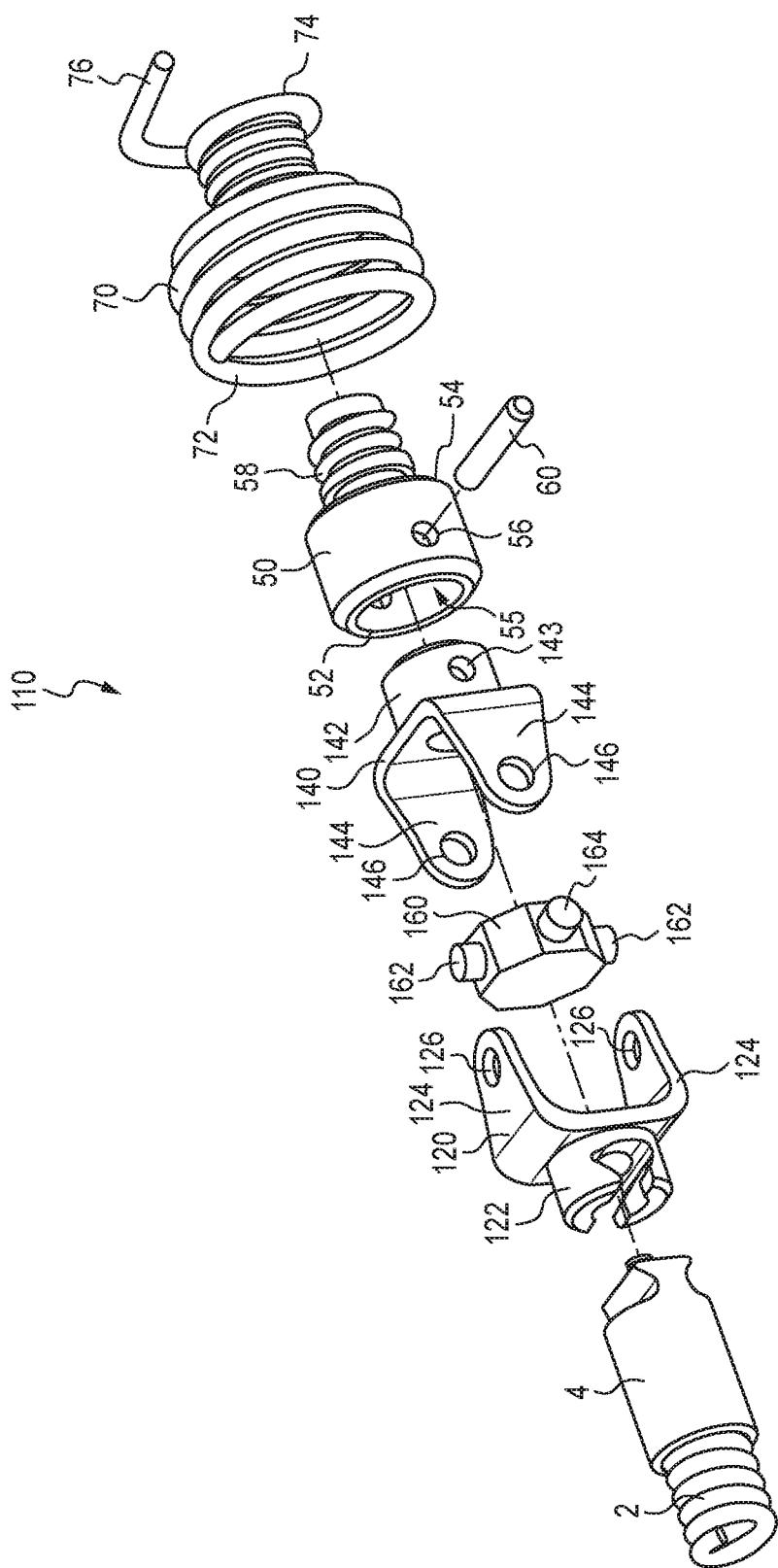
FIG. 3 is an exploded assembly view of another embodiment of a drop head coupling assembly in accordance with the present subject matter, shown with an end of a drain cleaning cable and a drop head.

FIG. 3 illustrates another drop head coupling assembly 110 in accordance with the present subject matter. The drop head coupling assembly 110 comprises a first fork 120, a second fork 140, and a center block 160. The first fork 120 includes provisions as described herein for releasably engaging a coupling 4 of a drain cleaning cable 2. The previously noted quick connect provisions could be used. And the second fork 140 includes provisions as described herein for releasably engaging a drop head coupling 50 such as by use of a pin 60. Additional details of this embodiment are as follows.

The first fork 120 includes a base 122 having provisions for releasably engaging a drain cleaning cable 2 and/or a coupling 4 of the cable 2. The first fork 120 also includes at least two engagement prongs 124 spaced apart from one another. Each engagement prong 124 defines an engagement aperture 126.

The second fork 140 includes a base 142. The base 142 defines an aperture 143. The fork 140 also includes at least two engagement prongs 144 spaced apart from one another. Each engagement prong 144 defines an engagement aperture 146.

The center block 160 is sized and shaped to reside between the engagement prongs 124 of the first fork 120 and the engagement prongs 144 of the second fork 140. The center block 160 includes outwardly extending engagement members for positioning in the engagement apertures of the prongs 124, 144. For example, in the version depicted in FIG. 3, the center block 160 includes engagement members 162 for insertion or positioning in the apertures 126 of the first fork 120, and outwardly extending engagement members 164 for insertion or positioning in the apertures 146 of the second fork 140.

The coupling assembly 110 also comprises a pin such as pin 60 which upon attachment between the second fork 140 of the coupling assembly 110 and a drop head coupling 50, is inserted in the aperture 56 of the drop head coupling 50 and the aperture 143 of the base 142 of the second fork 140. As previously described, the drop head coupling 50 defines a hollow interior 55. In this embodiment, the hollow interior 55 is sized and shaped to receive the base 142 of the second fork 140.

Figure 4:
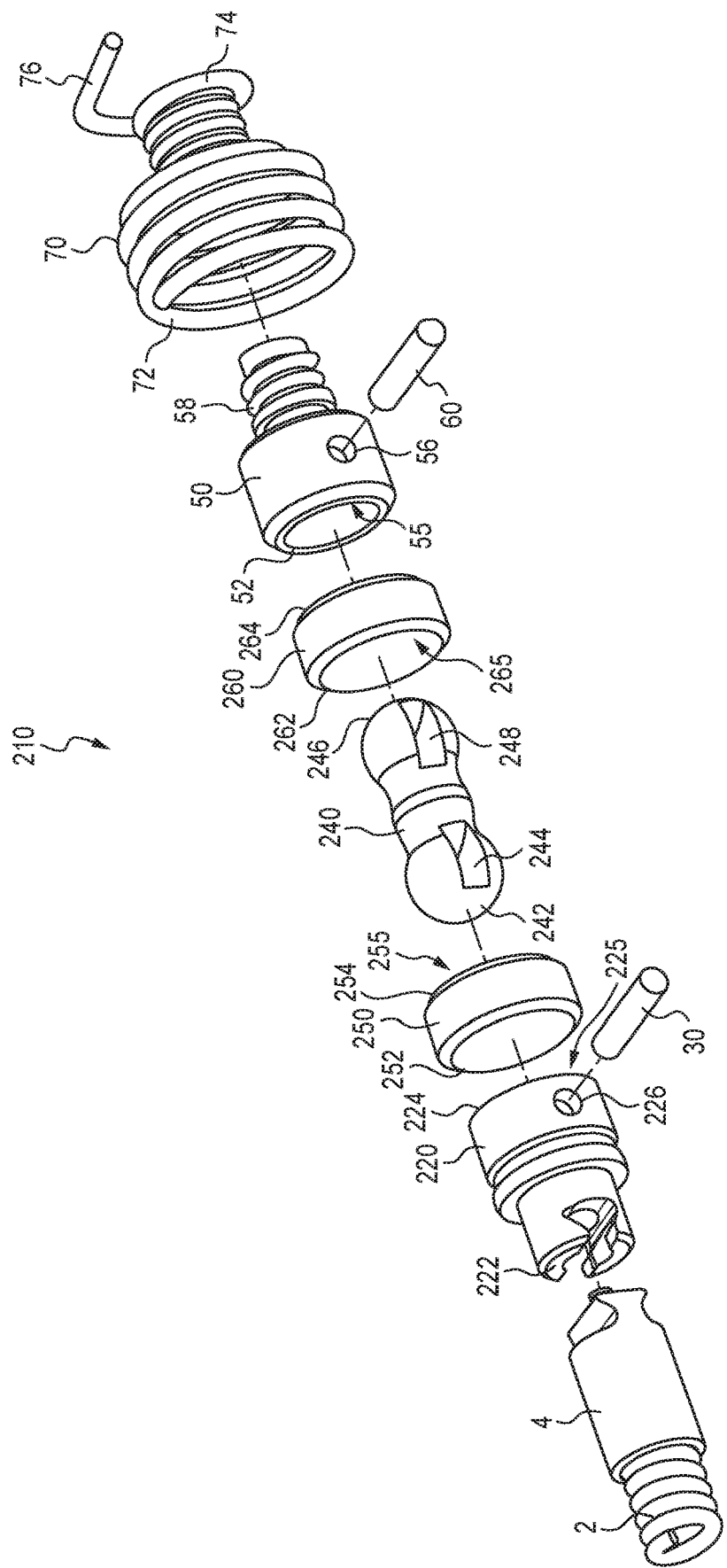
FIG. 4 is an exploded assembly view of another embodiment of a drop head coupling assembly in accordance with the present subject matter, shown with an end of a drain cleaning cable and a drop head.

FIG. 4 illustrates another drop head coupling assembly 210 in accordance with the present subject matter. The drop head coupling assembly 210 comprises a cable coupling 220, a connector 240, a first pin 30, a second pin 60, a first bushing 250, and a second bushing 260. The coupling assembly 210 engages the drain cleaning cable 2 and its coupling 4 with a drop head coupling 50 and its drop head 70.

The cable coupling 220 defines a proximal face 222, a distal face 224 which is typically oppositely directed from the proximal face 222, and a recessed receiving region 225 accessible from the distal face 224. The cable coupling 220 also defines at least one aperture 226 extending from an outer or exterior region of the coupling 220 to the receiving region 225. In many versions, the aperture(s) 226 are radially oriented with respect to a center longitudinal axis of the cable coupling 220. The aperture(s) 226 are sized and shaped to receive the pin 30 positioned therein. The cable coupling 220 can include provisions as previously described for selectively engaging the cable coupling 220 with the coupling 4 of the drain cleaning cable 2. In certain versions, these provisions are the noted quick connect provisions.

The connector 240 defines (i) a proximal portion or receiving region 242 and (ii) a distal portion or receiving region 246. The proximal receiving region 242 defines a first slot 244 extending through the proximal portion 242. And the distal receiving region 246 defines a second slot 248 extending through the distal portion 246.

The proximal portion 242 of the connector 240 and/or the receiving region 225 of the cable coupling 220 are sized and shaped such that the proximal portion 242 can be positioned within the receiving region 225 and the pin 30 inserted into the aperture 226 of the cable coupling 220 and through the first slot 244 of the connector 240. This configuration engages the connector 240 to the cable coupling 220.

The distal portion 246 of the connector 240 is sized and shaped such that the distal portion 246 can be positioned within a hollow interior 55 of a drop head coupling 50 and the pin 60 inserted into an aperture 56 of the coupling 50 and through the second slot 248 of the connector 240. This configuration engages the connector 240 to the drop head coupling 50.

The coupling assembly 210 also comprises a first bushing 250 and a second bushing 260. The first bushing 250 defines a proximal face 252, an oppositely directed second face 254, and a hollow interior 255 extending between the faces 252, 254. The second bushing 260 defines a proximal face 262, an oppositely directed second face 264, and a hollow interior 265 extending between the faces 262, 264.

Upon assembly of the coupling assembly 210, the proximal portion 242 of the connector 240 is inserted into and through the hollow interior 255 of the first bushing 250. And the distal portion 246 of the connector 240 is inserted into and through the hollow interior 265 of the second bushing 260. Thus, the proximal and distal portions 242, 246 of the connector 240 are sized and shaped to be inserted into and through the noted bushings. The pin 30 is inserted into the aperture 226 of the coupling 220 and into the slot 244 of the connector 240. And, the pin 60 is inserted into the aperture 56 of the drop head coupling 50 and into the slot 248 of the connector 240. This configuration of the coupling assembly 210 has been found to withstand application of high torque and force particularly in repetitive applications.

It is also contemplated that the various coupling assemblies of the present subject matter could utilize shaped male engagement regions such as a ball end on a male socket extension. Such engagement regions could potentially further simplify the coupling assembly.

Furthermore, it is also contemplated that a pin-less version of couplings could be employed to avoid the use of pins 30 and 60. Such a configuration has an advantage of fewer parts. In addition, it may be possible to investment cast the parts, and thereby avoid machining.

The various coupling assemblies described herein provide significant benefits and advantages as compared to currently known assemblies and techniques. For example, because of relatively small length(s) of coupling links, the drop head will easily navigate through toilet tracks/pipe fittings. The coupling assemblies exhibit a compact design with relatively few number of parts. The coupling assemblies are simple to manufacture and assemble. In many applications, the coupling assemblies are less costly to produce as compared to known assemblies. The coupling assemblies exhibit a relatively high degree of freedom of movement thereby reducing the chance of the assembly and/or tool getting stuck. The coupling assemblies can be releasably engaged with an auger.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A drop head coupling assembly for coupling a drain cleaning cable with a drop head, comprising:
   a cable coupling defining a proximal face, an opposite distal face, a recessed receiving region accessible along the distal face, and an aperture extending between an outer region of the coupling and the recessed receiving region, the cable coupling is used to couple with the drain cleaning cable;
   a pin sized and shaped to be positioned in the aperture defined in the cable coupling;
   a connector having a proximal receiving region defining a first aperture extending through the proximal receiving region, and a distal receiving region defining a second aperture extending through the distal receiving region, wherein the proximal receiving region of the connector is sized and shaped to be positioned within the recessed receiving region of the cable coupling such that the pin can be inserted through the aperture of the cable coupling and through the first aperture of the connector to thereby engage the cable coupling with the connector;
   a second pin sized and shaped to be positioned in the second aperture of the connector;
   a drop head coupling defining a proximal face, a distal face, and a hollow interior accessible along the proximal face, the drop head coupling also defining an aperture extending between an outer region of the coupling and the hollow interior, the hollow interior sized and shaped to receive the distal receiving region of the connector; the drop head coupling is used to couple with the drop head;
   wherein the second pin is disposed in the aperture defined in the drop head coupling and in the second aperture of the connector.

2. The drop head coupling assembly of claim 1 wherein the first aperture of the connector extends along a first aperture axis and the second aperture of the connector extends along a second aperture axis, wherein the first aperture axis and the second aperture axis are parallel with each other.

3. The drop head coupling assembly of claim 1 wherein the first aperture of the connector extends along a first aperture axis and the second aperture of the connector extends along a second aperture axis, wherein the first aperture axis and the second aperture axis are non-parallel with each other.

4. The drop head coupling assembly of claim 1 wherein the first aperture of the connector extends along a first aperture axis and the second aperture of the connector extends along a second aperture axis, wherein the first aperture axis and the second aperture axis are transverse with each other.

5. The drop head coupling assembly of claim 1 wherein the connector includes an intermediate member extending between the proximal receiving region and the distal receiving region, the intermediate member exhibiting flexibility during use of the drop head coupling assembly.

6. The drop head coupling assembly of claim 1 wherein at least one of the proximal receiving region and the distal receiving region is in the form of a spherical lobe.

7. The drop head coupling assembly of claim 6 wherein each of the proximal receiving region and the distal receiving region are in the form of a spherical lobe.

8. The drop head coupling assembly of claim 1 further comprising: a drop head engaged to the drop head coupling.

9. A drop head coupling assembly for use with a drain cleaning cable, the drop head coupling assembly comprising:
   a first fork including a base having provisions for releasably engaging a drain cleaning cable, and at least two engagement prongs spaced apart from one another, each engagement prong defining an engagement aperture;
   a second fork including a base defining an aperture, and at least two engagement prongs spaced apart from one another, each engagement prong defining an engagement aperture;
   a center block sized and shaped to be positioned between the engagement prongs of the first fork and the engagement prongs of the second fork, the center block including outwardly extending engagement members disposed in the engagement apertures of the engagement prongs of the first fork and the engagement apertures of the engagement prongs of the second fork;
   a pin sized and shaped to be positioned in the aperture of the base of the second fork;
   a drop head coupling defining a proximal face, a distal face, and a hollow interior accessible along the proximal face, the drop head coupling also defining an aperture extending between an outer region of the coupling and the hollow interior, the hollow interior sized and shaped to receive the base of the second fork.

10. The drop head coupling assembly of claim 9 further comprising: a drop head engaged to the drop head coupling.

11. A drop head coupling assembly for use with a drain cleaning cable, the drop head coupling assembly comprising:
   a cable coupling defining a proximal face, an opposite distal face, a recessed receiving region accessible along the distal face, and an aperture extending between an outer region of the coupling and the recessed receiving region;
   a pin sized and shaped to be positioned in the aperture defined in the cable coupling;
   a connector having a proximal receiving region defining a first slot extending through the proximal receiving region, and a distal receiving region defining a second slot extending through the distal receiving region, wherein the proximal receiving region of the connector is sized and shaped to be positioned within the recessed receiving region of the cable coupling such that the pin can be inserted through the aperture of the cable coupling and through the first slot of the connector to thereby engage the cable coupling with the connector;

a bushing defining a proximal face, an oppositely directed distal face, and a hollow interior extending between the proximal and distal faces, wherein the proximal receiving region of the connector is sized and shaped to be inserted into and through the hollow interior of the bushing.

12. The drop head coupling assembly of claim 11 wherein the pin is a first pin, the drop head coupling assembly further comprising:

a second pin sized and shaped to be positioned in the second slot of the connector.

13. The drop head coupling assembly of claim 11 wherein the bushing is a first bushing, the drop head coupling assembly further comprising:

a second bushing defining a proximal face, an oppositely directed distal face, and a hollow interior extending between the proximal and distal faces, wherein the distal receiving region of the connector is sized and shaped to be inserted into and through the hollow interior of the second bushing.

\* \* \* \* \*